(12) United States Patent
Hollinger et al.

(10) Patent No.: US 6,238,149 B1
(45) Date of Patent: May 29, 2001

(54) APPARATUS FOR DRILL PRESS

(75) Inventors: David N. Hollinger, Glenshaw; Andrew V. Bondi, Natrona Heights, both of PA (US)

(73) Assignee: Delta International Machinery Corp., Pittsburgh, PA (US)

( * ) Notice: Subject to any disclaimer, the term of this patent is extended or adjusted under 35 U.S.C. 154(b) by 0 days.

(21) Appl. No.: 09/609,661

(22) Filed: Jun. 30, 2000

Related U.S. Application Data

(62) Division of application No. 09/305,596, filed on May 5, 1999.

(51) Int. Cl.$^7$ ................................................ B23B 51/08
(52) U.S. Cl. ........................ 408/30; 33/639; 33/641; 144/74; 144/78; 408/24; 408/75
(58) Field of Search ..................... 408/22, 24, 30, 408/75; 33/628, 636, 639, 641, 645; 144/74, 78, 79

(56) References Cited

U.S. PATENT DOCUMENTS

| | | | |
|---|---|---|---|
| 1,062,583 | * | 5/1913 | Butts ........................................ 144/78 |
| 1,090,323 | * | 3/1914 | McMurty .................................. 144/78 |
| 2,821,218 | * | 1/1958 | Hultquist ................................ 144/74 |
| 2,834,233 | * | 5/1958 | Anderson ................................ 408/75 |
| 3,709,622 | | 1/1973 | Morse . |
| 4,593,450 | | 6/1986 | Dumire . |
| 5,012,566 | | 5/1991 | Getz, Jr. . |
| 5,078,552 | | 1/1992 | Albel . |
| 5,281,057 | | 1/1994 | Ritt . |
| 5,297,903 | | 3/1994 | Hilton . |
| 5,337,641 | | 8/1994 | Duginske . |
| 5,538,370 | | 7/1996 | Glenn . |
| 5,617,909 | | 4/1997 | Duginske . |
| 5,807,033 | | 9/1998 | Benway . |

* cited by examiner

Primary Examiner—Daniel W. Howell
(74) Attorney, Agent, or Firm—Kirkpatrick & Lockhart LLP

(57) ABSTRACT

A method for connecting an attachment to a drill press includes: providing an alignment member including a first portion and a second portion, and having a central axis; securing the first portion of the alignment member within the chuck; connecting the attachment to the drill press so that at least a region of the second portion of the alignment member is disposed within the void; and removing the alignment member from the chuck and the void. A mortising apparatus for a drill press is also disclosed, the drill press including a rotatable chuck. The mortising apparatus includes a mortising chisel holder and a mortising chisel holder alignment member.

18 Claims, 5 Drawing Sheets

APPARATUS FOR DRILL PRESS

The present application is a divisional application claiming priority under 35 U.S.C. § 120 from U.S. application Ser. No. 09/305,596, filed May 5, 1999.

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF INVENTION

1. Field of Invention

The present invention is directed to a method and an apparatus for connecting and properly orienting an attachment to a drill press. The present invention is more particularly directed to a method and an apparatus for properly aligning one or more elements of a mortising attachment during installation of the attachment on a drill press, and is further directed to a mortising apparatus including the alignment apparatus of the invention.

2. Background of Invention

The mortise-and-tenon joint is one of the strongest and most durable in all of woodworking. While the tenon typically may be cut on a table saw with relatively little difficulty, cutting the mortise is more difficult. The mortise may be carved by hand, but more typically is created using a dedicated mortising device or a specially designed mortising attachment used in conjunction with a drill press. A drill press-mounted mortising attachment eliminates the tedious handwork that otherwise would be required to cut the cavity, i.e., the mortise, which receives the tenon.

FIG. 1 illustrates certain elements of a typical drill press-mounted mortising attachment, generally identified as 10. The depicted portion of the drill press is generally identified as 12. The mortising attachment 10 includes a chisel holder 14 having an upper collar 16. The upper collar 16 is secured around the quill 18 of the drill press 12 above the chuck 20 by the clamping pressure of fastener 21. The chisel holder 14 also has two depending arms 22 which extend toward a lower collar 24, which defines a bore 26 therethrough. A mortising chisel 28 is inserted into the bore 26 of the lower collar 24 of the chisel holder 14, and is secured in place by set screw 29. A drill bit 30 designed to work in conjunction with the mortising chisel 28 may then be inserted through the central cavity of the mortising chisel 28 and up into the chuck 20, and is secured within the chuck 20. Thus, the drill bit 30 extends from the chuck 20 to the lower end 31 of the mortising chisel 28. In order to form the mortise, the chuck 20 rotates the drill bit 30 within the mortising chisel 28, and the quill 18 is lowered in order that the rotating bit 30 and the advancing mortising chisel 28 remove a generally rectangular piece of stock so as to form all or a portion of the mortise. Wood chips generated during the cutting operation by the rotating drill bit 30 are ejected from the interior of the mortising chisel 28 through a slot 32 located along a side of the mortising chisel 28.

Although not depicted in the appended figures, drill press-mounted mortising attachments typically are sold as kits that include elements in addition to a chisel holder. Such additional elements may include, for example, workpiece fences and hold-down brackets for positioning and securing the workpiece on the work support table of the drill press in a proper position for executing the one or more mortise cuts. An example of such a kit is the Delta International Machinery model 17-905 Mortising Attachment. Those of ordinary skill will be familiar with such other elements and, therefore, the elements are not depicted or described herein.

If the mortising chisel 28 and the drill bit 30 are not properly aligned relative to one another when they are secured to the chisel holder 28 and the chuck 20, respectively, the wood chips may not be ejected efficiently from the mortise cut. In addition, improper alignment of the mortising chisel 28 and drill bit 30 may cause the rotating drill bit to contact the mortising chisel during cutting, resulting in vibration and/or chatter. To provide proper alignment it is typically the case that, the central axis of the drill bit 30 must be substantially coincident with the central axis of the cavity within the mortising chisel 28. Contact between the drill bit 30 and the mortising chisel 28 may cause, for example, premature wear of the parts, and the resulting vibration may result in imprecise mortise cuts.

Prior art drill press-mounted mortising attachments typically provide no feature by which to ensure proper alignment of the drill bit 30 and mortising chisel 28. The process of achieving proper alignment of these elements in the prior art mortising attachments could fairly be characterized as "hit-or-miss". That is, the mortising attachment 10 is assembled generally without regard for alignment, and if the mortising chisel 28 and the drill bit 30 are found to not be properly aligned (i.e., vibration and/or chatter results), the mortising attachment is disassembled and then reassembled as necessary to modify the orientation of the chisel holder 14 relative to the chuck 20 until proper alignment of the drill bit 30 and the mortising chisel 28 is achieved.

The hit-or-miss alignment method may be time-consuming if, for example, the drill press is needed for multiple drilling operations and the mortising bit and chisel must be installed and aligned multiple times in a given period. Moreover, even successful utilization of the hit-and-miss method of alignment naturally results in some delay and reduces the efficiency of wood shop operations. Mortise cuts executed with the mortising chisel and the drill bit misaligned may be inaccurate and, as discussed above, the cutting elements may wear prematurely.

Accordingly, there exists a need for a quick and efficient manner of properly aligning the drill bit and mortising chisel elements of a drill press-mounted mortising attachment during installation of the attachment on the drill press.

BRIEF SUMMARY OF THE INVENTION

In order to address the foregoing deficiencies of the prior art, the present invention provides a method for connecting an attachment to a drill press, wherein the drill press includes a rotatable chuck and the attachment includes a void for receiving a tool. The method includes providing an alignment member having first and second portions and a central axis. The first portion of the alignment member is secured within the chuck of the drill press, and the attachment is connected to the drill press so that at least a region of the second portion of the alignment member is disposed within the tool-receiving void of the attachment. Subsequently, the alignment member is removed from both the chuck and the void. Preferably, when securing the first portion of the alignment member within the chuck, a central axis of the alignment member will be substantially coincident with the axis of rotation of the chuck, referred to hereinafter as the "central axis" of the chuck.

The present invention also is directed to a method of connecting a mortising chisel holder to a drill press so that the mortising chisel holder is properly aligned with the drill press. The mortising chisel holder will include a void or other receptacle for receiving a portion of a mortising chisel, and the drill press will include a rotatable chuck. The method includes providing an alignment member having first and second portions. The first portion of the alignment member is secured within the chuck, and the mortising chisel holder is attached to the drill press so that at least a region of the second portion of the alignment member is disposed within the mortising chisel-receiving bore of the mortising chisel holder. Subsequently, the alignment member is removed from the chuck and the void. Preferably, when the first portion of the alignment member is secured within the chuck, the central axis of the second portion of the alignment member will be substantially coincident with the central axis (axis of rotation) of the chuck.

The present invention is further directed to a method of connecting an attachment having an attachment receptacle to a drill press, and wherein the drill press includes a quill having a rotatable chuck. The method includes: providing an alignment member; securing the alignment member within the chuck; and connecting the attachment to the quill so that the alignment member is disposed in the attachment receptacle. In securing the alignment member within the chuck, it is preferable that a central axis of at least a portion of the alignment member coincides with the central axis (axis of rotation) of the chuck.

The present invention is additionally directed to a mortising apparatus for a drill press, wherein the drill press includes a rotatable chuck. The kit includes a mortising chisel holder and an alignment member for the mortising chisel holder. The alignment member may be used to properly align the mortising chisel holder on the drill press.

The present invention provides a quick and efficient method for attaching a tool-receiving attachment, such as a mortising chisel holder, to a drill press in a proper alignment condition with the drill press. By use of the method, an operator may avoid the "hit-and-miss" method of alignment currently used in connection with attaching certain mortising chisel holders to drill presses. Vibration and/or chatter caused by contact between the mortising chisel and the drill bit may thereby be reduced or entirely avoided.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE SEVERAL VIEWS OF THE DRAWING

The features and advantages of the present invention may be better understood by reference to the accompanying drawings in which like reference numerals refer to like elements and in which.

DETAILED DESCRIPTION OF THE INVENTION

While the present invention is susceptible of embodiment in many different forms, this specification and the accompanying drawings disclose only certain specific forms as examples of the invention. The invention is not intended to be limited to the embodiments so described, and the scope of the invention is set forth in the appended claims. Also, the invention may be used with certain conventional components of drill press or other like devices, and the details of those conventional components, although not fully described or illustrated herein, will be apparent to those having ordinary skill in the art.

Also, it is to be understood that the figures and descriptions of the present invention have been prepared to illustrate elements that are relevant for a clear understanding of the present invention, while eliminating, for purposes of clarity, other elements. However, because such elements are well known in the art, and because they do not facilitate a better understanding of the present invention, a discussion of such elements is not provided herein.

Figure 1:
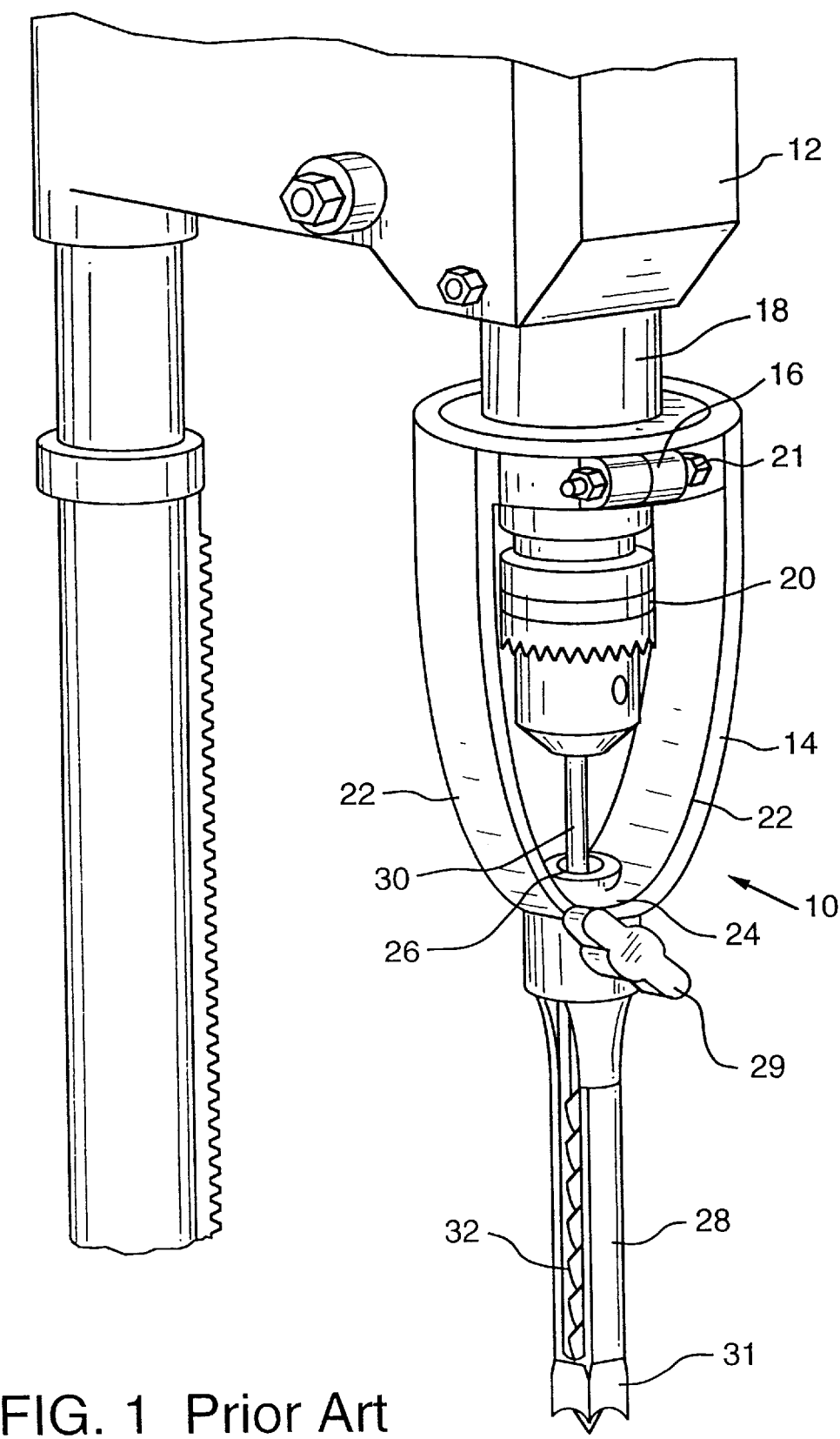
FIG. 1 is a perspective view of certain elements of a prior art mortising attachment shown attached to a drill press.
Figure 2:
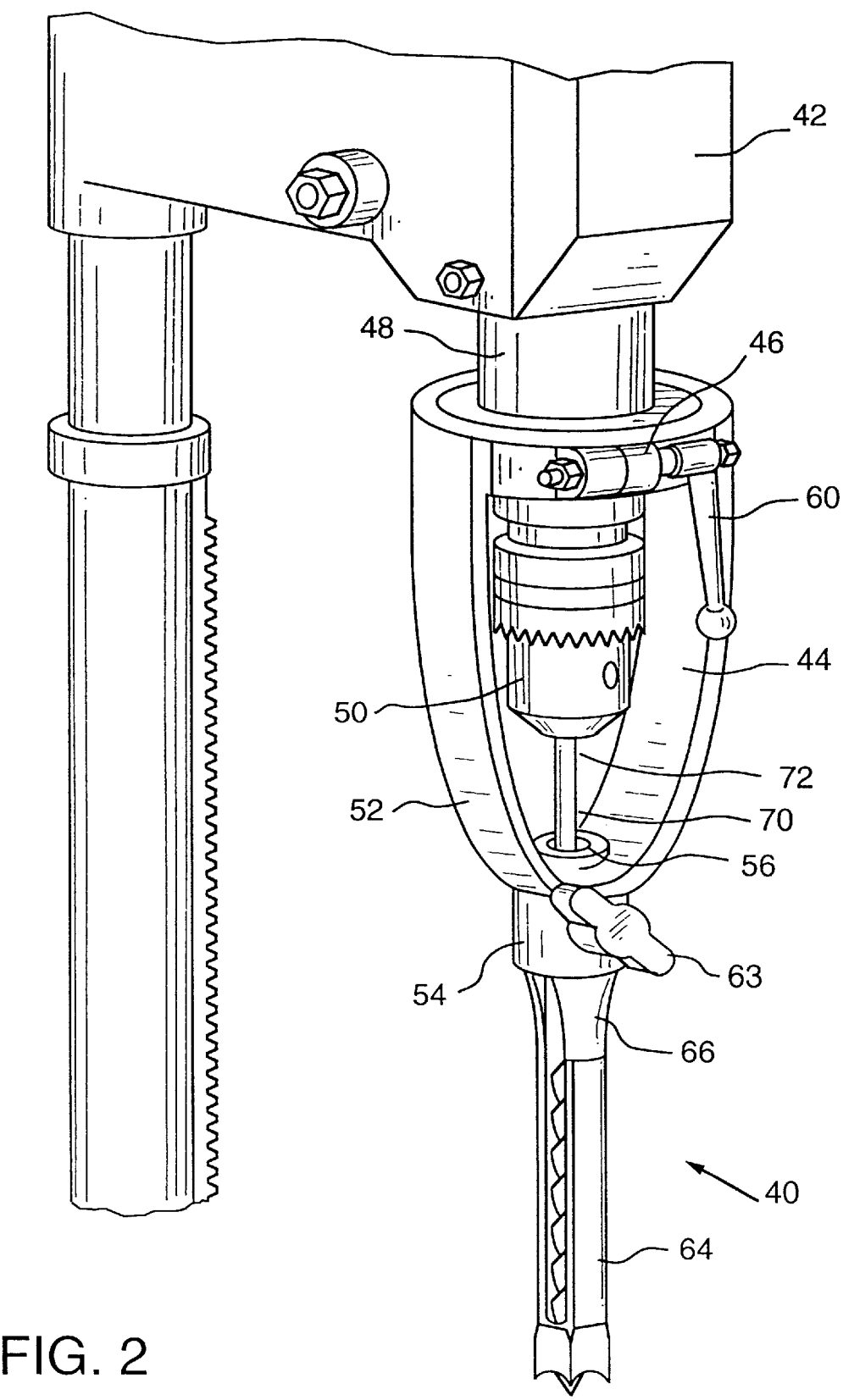
FIG. 2 is a perspective view of a mortising apparatus of the present invention, shown attached to a drill press of a conventional design, and further depicting certain aspects of the alignment method of the present invention.
Figure 3:
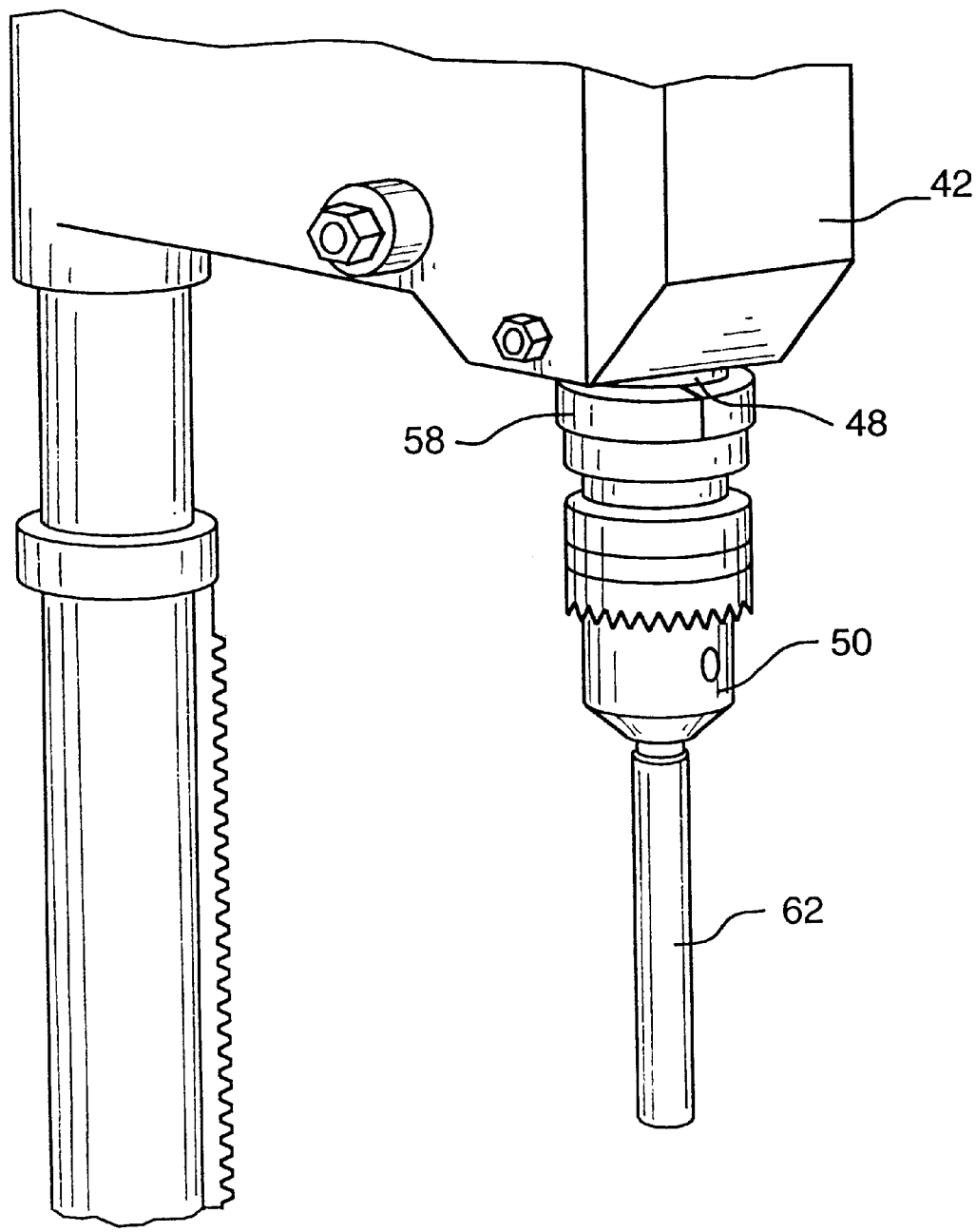
FIG. 3 is a perspective view showing certain elements of a drill press of a conventional design, and further showing an embodiment of an alignment member of the present invention mounted on the drill press chuck.
Figure 4:
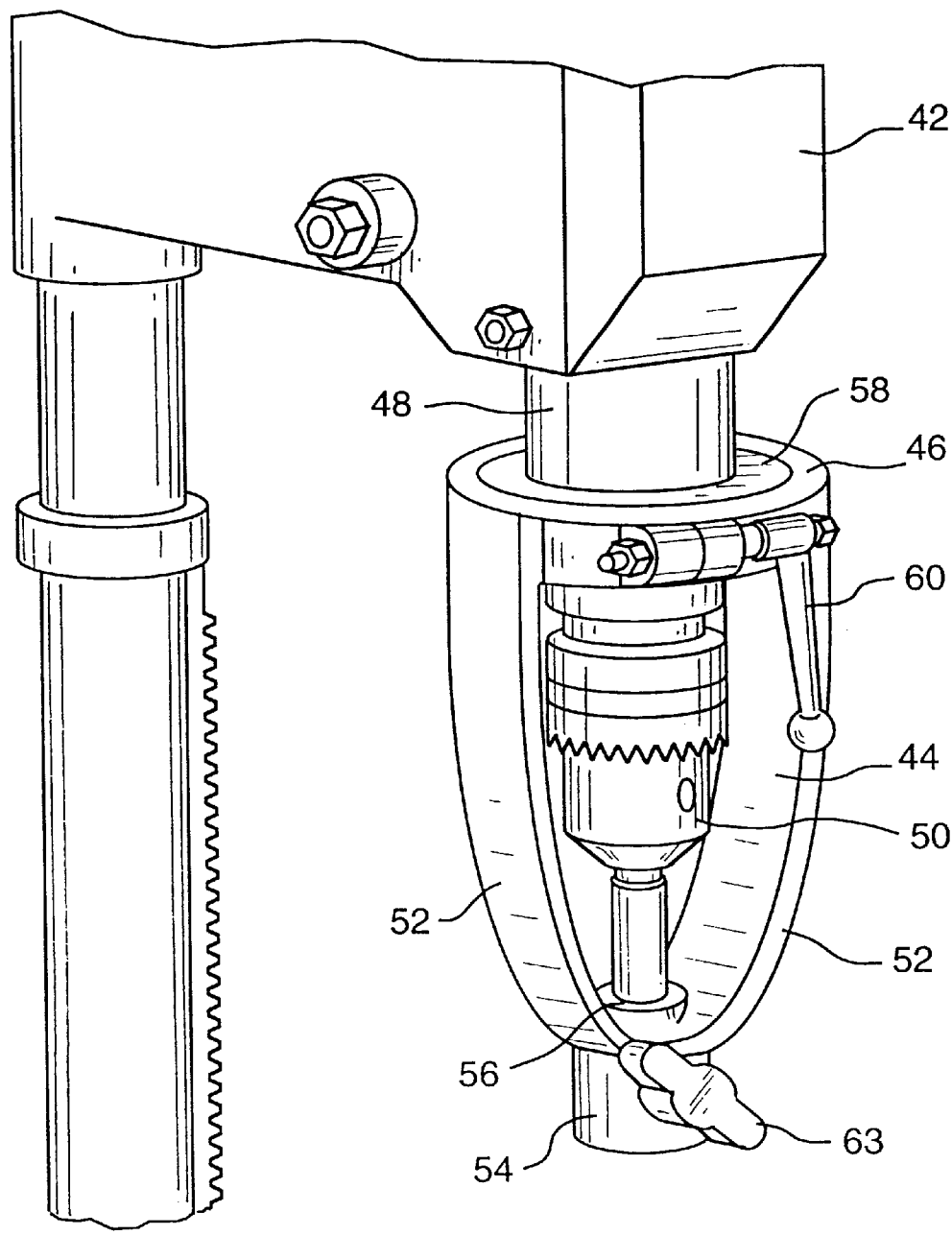
FIG. 4 is a perspective view of a mortising apparatus of the present invention, shown attached to a drill press of a conventional design, and further showing an embodiment of an alignment member of the present invention secured between the drill press chuck and the attachment receptacle of the mortising chisel holder.

FIGS. 2–4 illustrate a method of aligning elements of an attachment in the form of a drill press-mounted mortising attachment 40 according to one embodiment of the present invention. As illustrated in FIG. 2, mortising attachment 40 includes a mortising chisel holder 44. The mortising attachment 40 may be provided as a component of a kit that may include other elements, such as workpiece fence and hold-downs, which are not depicted in the accompanying figures. The mortising chisel holder 44 includes an upper collar 46 which is secured around the quill 48 of the drill press 42, above the rotating chuck 50. The chisel holder 44 also includes two depending portions 52 which extend toward a lower collar 54 of the mortising chisel holder 44. The lower collar 54 defines an attachment receptacle such as, for example, a bore 56, which receives a non-cutting portion 66 of a mortising chisel 64.

Prior to attaching the mortising chisel holder 44 to the quill 48 of the drill press 42, a split-ring bushing 58 may first be fitted around the quill 48, as illustrated in FIG. 3. In addition, prior to attaching the chisel holder 44 to the drill press 42, an alignment member in the form of, for example, an alignment pin 62, is inserted into and secured in the chuck 50. The alignment pin 62 is configured so that its central axis is substantially coincident with the central axis of the chuck 50 when the alignment pin 62 is secured in the chuck 50. The exterior dimensions of the alignment pin 62 closely correspond to the inner dimensions of the bore 56 in at least the region of the alignment pin 62 that would be disposed within the bore 56 when the alignment pin 62 is secured in the chuck 50 and the mortising chisel holder 52 is secured about the quill 48.

With the alignment pin 62 secured in and extending from the chuck 50 as illustrated in FIG. 3, the mortising chisel holder 44 is connected to the drill press 42 as follows and as illustrated in FIG. 4. Starting from a point below the alignment pin 62, the mortising chisel holder 44 is raised toward the quill 48 such that a portion of the alignment pin 62 is disposed within the bore 56 of the chisel holder 44. The upper collar 46 of the mortising chisel holder 44 is fastened to the quill 48 around the bushing 58. The mortising chisel holder 44 may then be locked into place such as by, for example, a locking lever 60 connected to the upper collar 46 of the mortising chisel holder 44. The alignment pin 62 is of sufficient length in relation to the mortising chisel holder 44 so that it may extend from the chuck 50 with the portion of the alignment pin 62 having dimensions corresponding to the inner dimensions of the bore 56 disposed within the bore 56. The position of the alignment pin 62 relative to the bore 56 may be locked by, for example, a thumb screw 63 or other similar fastener mounted through or on the lower collar 54 of the mortising chisel holder 44. With the mortising chisel holder 44 attached to the drill press 42 such that the alignment pin 62 is disposed in both the chuck 50 and the bore 56, the alignment pin 62 ensures that the chuck 50 and bore 56 are oriented in a substantially coaxial fashion to thereby properly align the chisel holder 52 relative to the chuck 50. When that alignment condition is achieved, the central axis of the drill bit 70 disposed through the central void of the mortising chisel 64 will be substantially coaxial with the central axis of the central void. The result is that a drill bit attached to the chuck may rotate freely within the central void of its mortising chisel, without contacting the mortising chisel, thereby reducing or eliminating the problem associated with misalignment of those elements, which are discussed above.

To complete installing the mortising attachment 40, the alignment pin 62 is removed from the chuck 50, such as by loosening the locking lever 60 and thumb screw 63. A mortising chisel 64 is then connected to the mortising chisel holder 44. To connect the mortising chisel 64 to the mortising chisel holder 44, a non-cutting end 66 of the mortising chisel 64 is inserted into the bore 56. The mortising chisel 64 may then be locked into place, such as by thumb screw 63. A drill bit 70 is then inserted up through the chisel 64, and an end 72 of the drill bit 70 is inserted and locked into the chuck 50. As is known in the art, the drill bit 70 and the mortising chisel 64 will be a matched set designed so that, if properly aligned, the drill bit may rotate freely within the mortising chisel's central void. Because the alignment pin 62 is used to align the axes of the chuck 50 and the bore 56, the mortising chisel 64 and the drill bit 70 will be properly aligned for effectively and efficiently cutting the mortise, avoiding vibration and chatter caused by contact between the mortising chisel 64 and the drill bit 70.

Figure 5:
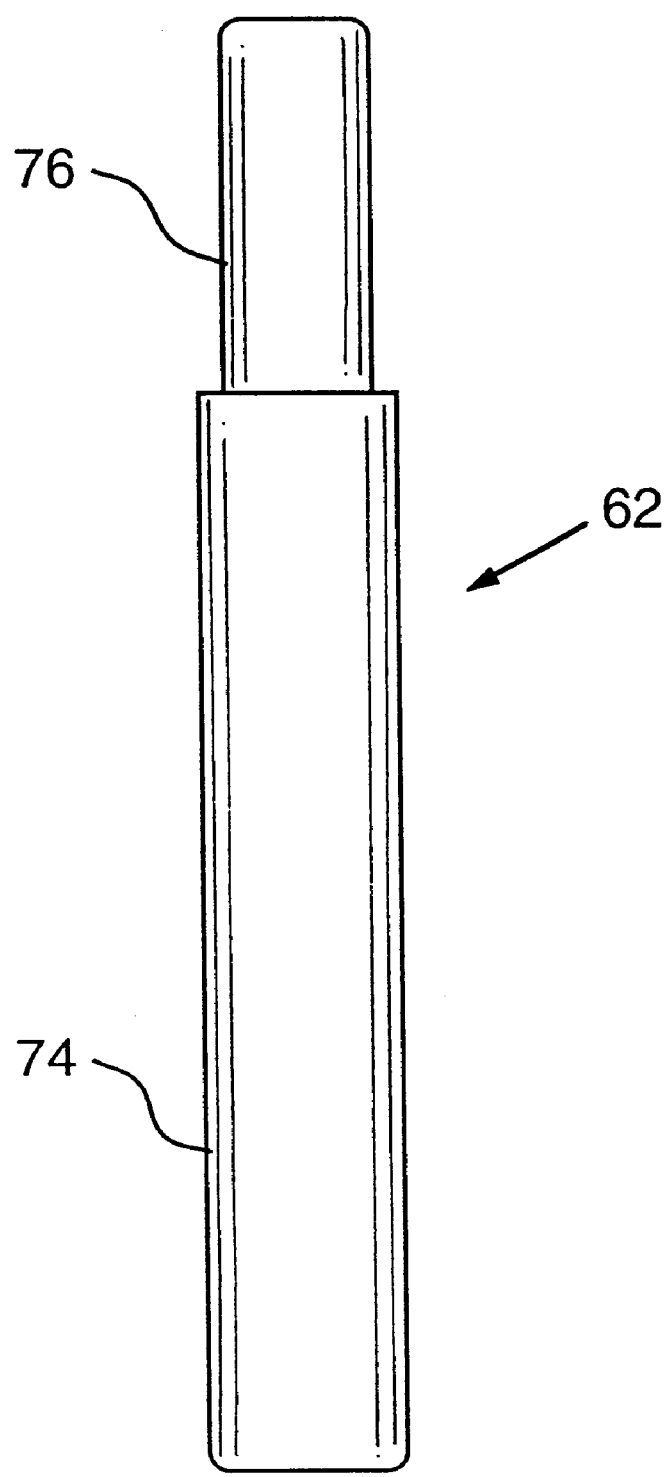
FIG. 5 is a cross-sectional view of an embodiment of an alignment member according to the present invention.

FIG. 5 illustrates an embodiment of an alignment pin 62 according to the present invention. The alignment pin 62 includes first and second portions in the form of a chuck portion 76 and a body portion 74. The chuck portion 76 is inserted into the chuck 50 prior to the attachment of the chisel holder 44. The chuck portion 76 is shaped so as to be secured within the chuck 50, and may be, for example, cylindrical, hexagonal, or octagonal. At least a region of the body portion 74 of the chuck is disposed in the bore 56 during attachment and alignment of the mortising chisel holder 44. That particular region of the body portion 74 is shaped to include a region that may closely fit within the bore 56 when the chuck portion 76 is secured to the chuck 50, in order to ensure alignment of the axes of the bore 56 and chuck 50, and may be, for example, cylindrical. For the embodiment illustrated in FIG. 5, the cross-sectional area of the body portion 74 is greater than the cross-sectional area of the chuck portion 76. In alternative embodiments, the relative cross-sectional areas may differ from those illustrated. The alignment pin 62 preferably is made of, for example, a material of sufficient rigidity such that it will not deform under the forces securing it within the chuck 50 and the bore 56 of the chisel holder 44, and may, for example, be made of metal. The alignment pin 62 is of sufficient length so that when the chuck portion 76 is secured within the chuck 50, the portion of the body portion 74 that is to be disposed and closely fit within the bore 56 of the chisel holder 52 occupies that region.

The present invention is also directed to a kit for connecting a mortising attachment 40 to a drill press 42. The kit may include, for example, the chisel holder 44 and the alignment pin 62. The kit may also include, for example, the chisel 64 and a drill bit 70 and other workpiece positioning and securing elements not specifically described herein, but familiar to those of ordinary skill in the art. The mortising attachment 40 may be connected to the drill press 42 as described hereinbefore or as otherwise known to those of ordinary skill in the art.

Although the foregoing detailed description of embodiments of the present invention specifically describes a method and apparatus relating to the attachment of an element of a mortising apparatus to a drill press, it will be understood that the present method of properly aligning a drill press-mounted attachment to the drill press has greater applicability. For example, the present method may be used to properly align any attachment that is mounted to a drill press and that includes a receptacle for mounting a tool, wherein the attachment will be properly aligned when the central axis of the tool-receiving receptacle is substantially coaxial with the central axis of the chuck and/or quill of the drill press. Accordingly, the following claims also are directed to an invention of that scope.

Those of ordinary skill in the art will recognize that many modifications and variations of the present invention may be implemented. The foregoing description and the following claims are intended to cover all such modifications and variations.

What is claimed is:

1. A mortising apparatus for a drill press, the drill press including a rotatable chuck, the mortising apparatus comprising:
   a mortising chisel holder; and
   a mortising chisel holder alignment member.

2. The mortising apparatus of claim 1, wherein the mortising chisel holder defines a void, a region of said alignment member being disposed within and substantially conforming to said void when said mortising chisel holder is secured to the drill press and said alignment member is secured within the chuck, a central axis of said alignment member being substantially coincident with both a central axis of said void and a central axis of the chuck when said mortising chisel holder is secured to the drill press and said alignment member is secured within the chuck.

3. The mortising apparatus of claim 2, further comprising a mortising chisel attachable to said mortising chisel holder.

4. The mortising apparatus of claim 3, wherein the alignment member includes a chuck portion and a body portion, both said chuck portion and said body portion having substantially coincident central axes.

5. The mortising apparatus of claim 4, wherein said body portion and said chuck portion are individually of a shape selected from the group consisting of cylindrical, hexagonal, and octagonal.

6. The mortising apparatus of claim 5, wherein said chuck portion is shaped to be received by and secured within the chuck.

7. The mortising apparatus of claim 1 wherein said mortising chisel holder alignment member is for coaxially aligning the chuck and a tool-receiving void defined by said mortising chisel holder.

8. An apparatus attachable to a drill press, the drill press including a rotatable chuck, the apparatus comprising:
 a tool holder having a tool-receiving void; and
 an elongate tool holder alignment member including a first portion and a second portion, wherein said first portion is adapted to be mounted in the rotatable chuck and said second portion is adapted to be mounted in the tool-receiving void so that a central axis of the rotatable chuck is substantially coincident with a central axis of the tool-receiving void.

9. The apparatus of claim 8, wherein the attachment is a mortising apparatus, said tool holder is a mortising chisel holder, and said tool-receiving void is a mortising chisel-receiving void.

10. The apparatus of claim 8, wherein said first portion and said second portion are individually of a shape selected from the group consisting of cylindrical, hexagonal, and octagonal.

11. The apparatus of claim 8, wherein said tool holder alignment member is for coaxially aligning the chuck and the tool-receiving void.

12. An apparatus attachable to a drill press, the drill press including a rotatable chuck, the apparatus comprising:
 a tool holder including a void having a central axis; and
 an alignment member.

13. The apparatus of claim 12, wherein the alignment member includes a first portion and a second portion and the tool holder is adapted to receive said first portion when said tool holder is secured to the drill press and said second portion of said alignment member is secured within the chuck, an axis of said alignment member being substantially coincident with said central axis of said void and a central axis of the chuck when said tool holder is secured to the drill press and said alignment member is secured within the chuck.

14. The apparatus of claim 12, wherein a central axis of said first portion and a central axis of said second portion are substantially coincident.

15. The apparatus of claim 12, wherein the apparatus is a mortising apparatus and said tool holder is a mortising chisel holder.

16. The apparatus of claim 12, wherein said first portion and said second portion are individually of a shape selected from the group consisting of cylindrical, hexagonal, and octagonal.

17. The apparatus of claim 12, further comprising a tool attachable to said tool holder.

18. The apparatus of claim 17, wherein said tool is a mortising chisel.

\* \* \* \* \*